(12) United States Patent
DeCusatis (10) Patent No.: US 8,985,785 B2
(45) Date of Patent: Mar. 24, 2015

(54) THREE DIMENSIONAL LASER IMAGE PROJECTOR

(75) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/357,715

(22) Filed: Jan. 25, 2012

(65) Prior Publication Data

US 2013/0188145 A1  Jul. 25, 2013

(51) Int. Cl.
| | |
|---|---|
| *G03B 21/26* | (2006.01) |
| *G03B 21/28* | (2006.01) |
| *H01S 5/00* | (2006.01) |
| *G02B 27/10* | (2006.01) |
| *G02B 27/26* | (2006.01) |
| *G03B 21/20* | (2006.01) |
| *G03B 33/12* | (2006.01) |
| *G03B 35/16* | (2006.01) |
| *G03B 35/26* | (2006.01) |
| *H04N 13/04* | (2006.01) |
| *G02B 27/22* | (2006.01) |

(52) U.S. Cl.
CPC ........ *G02B 27/1033* (2013.01); *G02B 27/2264* (2013.01); *G02B 27/26* (2013.01); *G03B 21/2033* (2013.01); *G03B 21/2066* (2013.01); *G03B 33/12* (2013.01); *G03B 35/16* (2013.01); *G03B 35/26* (2013.01); *H04N 13/0427* (2013.01); *H04N 13/0438* (2013.01); *H04N 13/0459* (2013.01)
USPC ............ 353/94; 353/98; 353/99; 362/311.02; 372/50.12

(58) Field of Classification Search
USPC .............. 353/94, 98, 99; 362/349.02, 311.02; 372/50.12
See application file for complete search history.

(56) References Cited

U.S. PATENT DOCUMENTS

| | | | |
|---|---|---|---|
| 4,630,097 | A | 12/1986 | Marks |
| 4,870,486 | A | 9/1989 | Nakagawa et al. |
| 5,113,285 | A | 5/1992 | Franklin et al. |
| 5,142,366 | A | 8/1992 | Brown et al. |
| 5,168,199 | A | 12/1992 | Huffman et al. |

(Continued)

FOREIGN PATENT DOCUMENTS

| | | | |
|---|---|---|---|
| CN | 1624525 A | | 6/2005 |
| CN | 1666269 A | | 9/2005 |

(Continued)

OTHER PUBLICATIONS

U.S. Appl. No. 13/357,719; Final Office Action; filed Jan. 25, 2012; Date Mailed: Jan. 27, 2014; pp. 1-37.

(Continued)

*Primary Examiner* — Toan Ton
*Assistant Examiner* — Magda Cruz
(74) *Attorney, Agent, or Firm* — Cantor Colburn LLP; Steven Chiu (57) ABSTRACT

A projection system is provided. The system includes a first light source emitting light at a first polarization. A second light source is provided adjacent the first light source, the second light source emitting light at a second polarization. A digital mirror device (DMD) is provided having a first axis. A mirror optically is disposed adjacent the DMD between the first light source, the second light source and the DMD. The first light source and second light source emit light that is reflected onto the DMD.

16 Claims, 4 Drawing Sheets

(56) References Cited

U.S. PATENT DOCUMENTS

| | | |
|---|---|---|
| 5,420,484 A | 5/1995 | Morrish |
| 5,751,479 A | 5/1998 | Hamagishi et al. |
| 6,327,093 B1 | 12/2001 | Nakanishi et al. |
| 6,359,664 B1 | 3/2002 | Faris |
| 6,672,722 B2 | 1/2004 | O'Connor et al. |
| 6,704,065 B1 | 3/2004 | Sharp et al. |
| 6,813,085 B2 | 11/2004 | Richards |
| 7,081,997 B2 | 7/2006 | Sedlmayr |
| 7,119,957 B2 | 10/2006 | Itoh et al. |
| 7,270,428 B2 | 9/2007 | Alasaarela et al. |
| 7,283,308 B2 | 10/2007 | Cossairt et al. |
| 7,401,923 B2 | 7/2008 | Fergason |
| 7,446,733 B1 | 11/2008 | Hirimai |
| 7,468,844 B2 | 12/2008 | Hall, Jr. |
| 7,477,220 B2 | 1/2009 | Muto |
| 7,561,322 B1 | 7/2009 | Maeda et al. |
| 7,692,605 B2 | 4/2010 | Tsao |
| 7,766,490 B2 | 8/2010 | Harbers et al. |
| 7,773,160 B2 | 8/2010 | Yamazaki et al. |
| 7,848,370 B2 | 12/2010 | Kewitsch et al. |
| 8,337,020 B2 | 12/2012 | Handschy et al. |
| 8,388,138 B1 | 3/2013 | Boothroyd |
| 2002/0191235 A1 | 12/2002 | O'Connor et al. |
| 2003/0179791 A1 | 9/2003 | Hiroshi et al. |
| 2004/0109329 A1 | 6/2004 | Kato |
| 2004/0155207 A1 | 8/2004 | Kleinschmidt |
| 2004/0201879 A1 | 10/2004 | Shih et al. |
| 2004/0207879 A1 | 10/2004 | Bailey et al. |
| 2006/0187393 A1 | 8/2006 | Kuan et al. |
| 2006/0232845 A1 | 10/2006 | Harned et al. |
| 2006/0238716 A1 | 10/2006 | Lee et al. |
| 2006/0279662 A1 | 12/2006 | Kapellner et al. |
| 2006/0290889 A1 | 12/2006 | Robinson et al. |
| 2007/0035830 A1 | 2/2007 | Matveev et al. |
| 2007/0115230 A1 | 5/2007 | Tajiri et al. |
| 2007/0139519 A1 | 6/2007 | DeCusatis et al. |
| 2007/0139618 A1 | 6/2007 | DeCusatis et al. |
| 2007/0139769 A1 | 6/2007 | DeCusatis et al. |
| 2007/0146880 A1 | 6/2007 | Bleha et al. |
| 2007/0181834 A1 | 8/2007 | Kleinschmidt |
| 2007/0188863 A1 | 8/2007 | Sun et al. |
| 2007/0195408 A1 | 8/2007 | Divelbiss et al. |
| 2008/0018999 A1 | 1/2008 | Schuck et al. |
| 2008/0043295 A1 | 2/2008 | Sakakibara |
| 2008/0055550 A1 | 3/2008 | Kim |
| 2008/0094577 A1 | 4/2008 | Krijn et al. |
| 2008/0151193 A1 | 6/2008 | Reder |
| 2009/0040463 A1 | 2/2009 | Chen et al. |
| 2009/0086016 A1 | 4/2009 | Su |
| 2009/0141242 A1 | 6/2009 | Silverstein et al. |
| 2009/0180181 A1 | 7/2009 | Oakley |
| 2009/0207379 A1 | 8/2009 | Oakley |
| 2009/0231549 A1 | 9/2009 | Chen et al. |
| 2009/0310042 A1 | 12/2009 | Vidal et al. |
| 2010/0039624 A1 | 2/2010 | Fujinawa et al. |
| 2010/0045938 A1* | 2/2010 | Lin et al. ............ 353/33 |
| 2010/0110386 A1 | 5/2010 | Handschy et al. |
| 2010/0118276 A1 | 5/2010 | Li |
| 2010/0141856 A1 | 6/2010 | Schuck et al. |
| 2010/0171909 A1 | 7/2010 | Handschy |
| 2010/0189344 A1 | 7/2010 | Maes |
| 2010/0208210 A1 | 8/2010 | Aastuen et al. |
| 2010/0238413 A1 | 9/2010 | Huang |
| 2010/0253769 A1 | 10/2010 | Coppeta et al. |
| 2010/0272138 A1 | 10/2010 | Chiba et al. |
| 2011/0089315 A1* | 4/2011 | Walt et al. ............ 250/251 |
| 2011/0116051 A1 | 5/2011 | Young et al. |
| 2011/0149253 A1 | 6/2011 | Mihashi |
| 2011/0204793 A1 | 8/2011 | Gardner, Jr. |
| 2011/0211168 A1* | 9/2011 | Kim et al. ............ 353/31 |
| 2011/0273539 A1 | 11/2011 | Yoon et al. |
| 2012/0019529 A1 | 1/2012 | Kimpe |
| 2012/0287144 A1 | 11/2012 | Gandhi et al. |
| 2012/0307211 A1 | 12/2012 | Hofmann et al. |
| 2013/0077283 A1 | 3/2013 | Li |
| 2013/0082994 A1 | 4/2013 | Al-Dahle |
| 2013/0147393 A1 | 6/2013 | Bazzani et al. |

FOREIGN PATENT DOCUMENTS

| | | | |
|---|---|---|---|
| CN | 1721961 A | 1/2006 | |
| CN | 1885096 A | 12/2006 | |
| CN | 1987552 A | 6/2007 | |
| CN | 101196615 A | 6/2008 | |
| CN | 101364037 A | 2/2009 | |
| CN | 101373054 A | 2/2009 | |
| CN | 101482665 A | 7/2009 | |
| CN | 101571631 A | 11/2009 | |
| CN | 101625467 A | 1/2010 | |
| CN | 101770150 A | 7/2010 | |
| CN | 201576164 U | 9/2010 | |
| CN | 102043254 A | 5/2011 | |
| CN | 102089701 A | 6/2011 | |
| CN | 102193239 A | 9/2011 | |
| CN | 202057900 U | 11/2011 | |
| CN | 102300108 A | 12/2011 | |
| JP | 2000284223 A | 10/2000 | |
| JP | 2001222064 A | 8/2001 | |
| JP | 2007065408 A | 3/2007 | |
| JP | 2008064809 A | 3/2008 | |
| WO | 9952269 | 10/1999 | |
| WO | 2005032150 A1 | 4/2005 | |
| WO | 2010143891 A2 | 12/2010 | |
| WO | WO 2010143891 A2 * | 12/2010 | ............ G03B 21/14 |

OTHER PUBLICATIONS

U.S. Appl. No. 13/673,462; Non-Final Office Action; filed Nov. 9, 2012; Date Mailed: Jan. 30, 2014; pp. 1-53.

U.S. Appl. No. 13/357,737; Notice of Allowance; filed Jan. 25, 2012; Date Mailed: Jan. 13, 2014; pp. 1-17.

U.S. Appl. No. 13/357,725; Notice of Allowance; filed Jan. 25, 2012; Date Mailed: Jan. 17, 2014; pp. 1-16.

International Application No. PCT/CN2013/070865; International Search Report and Written Opinion dated May 2, 2013, 14 pages.

International Application No. PCT/CN2013/070883; International Search Report and Written Opinion dated May 2, 2013, 12 pages.

International Application No. PCT/CN2013/070831; International Search Report and Written Opinion dated May 9, 2013, 11 pages.

International Application No. PCT/CN2013/070888; International Search Report and Written Opinion dated May 2, 2013, 11 pages.

International Application No. PCT/CN2013/070828; International Search Report and Written Opinion dated Apr. 25, 2013, 13 pages.

U.S. Appl. No. 13,357,704; Non Final Office Action; filed Jan. 25, 2012; Date Mailed: Jul. 15, 2013; pp. 1-24.

U.S. Appl. No. 13/357,725; Non Final Office Action; filed Jan. 25, 2012; Date Mailed: Jul. 15, 2013; pp. 1-28.

U.S. Appl. No. 13/357,719; Non Final Office Action; filed Jan. 25, 2012; Date Mailed: Jul. 26, 2013; pp. 1-33.

U.S. Appl. No. 13/672,877; Non Final Office Action; filed Nov. 9, 2012; Date Mailed: Oct. 3, 2013; pp. 1-24.

U.S. Appl. No. 13/357,704; Final Office Action; filed Jan. 25, 2012; Date Mailed: Oct. 30, 2013; pp. 1-23.

U.S. Appl. No. 13/672,980; Non Final Office Action; filed Nov. 9, 2012; Date Mailed: Nov. 8, 2013; pp. 1-41.

U.S. Appl. No. 13/357,737; Notice of Allowance; filed Jan. 25, 2012; Date Mailed: Nov. 22, 2013; pp. 1-56.

U.S. Appl. No. 13/672,947; Non Final Office Action; filed Nov. 9, 2012; Date Mailed: Nov. 26, 2013; pp. 1-40.

Chen et al.; "Simple Multimode Stereoscopic Liquid Crystal Display"; Japanese Journal of Applied Physics; Part 2 (Letters); vol. 36; No. 12B; pp. L1685-1688; Dec. 15, 1997.

Fergason et al.; An innovative beamsplitter-based stereoscopic/3D display design, Proceedings of SPIE—The International Society for Optical Engineering; vol. 5664; No. 1; pp. 488-494; Mar. 22, 2005.

Pezzaniti et al.; "Flat Panel 3D Display for Unmanned Ground Vehicles"; Proceedings of SPIE—The International Society for Optical Engineering; vol. 7332; pp. 73320N, 2009.

(56) References Cited

OTHER PUBLICATIONS

U.S. Appl. No. 13,673,112; Non Final Office Action; filed Nov. 9, 2012; Date Mailed: Dec. 13, 2013; pp. 1-42.
U.S. Appl. No. 13/357,725; Notice of Allowance; filed Jan. 25, 2012; Date Mailed: Nov. 20, 2013; pp. 1-33.
U.S. Appl. No. 13/651,780; Notice of Allowance; filed Oct. 15, 2012; Date Mailed: Dec. 23, 2013 pp. 1-21.
U.S. Appl. No. 13/672,877; Final Office Action; filed Nov. 9, 2012; Date Mailed: Mar. 26, 2014; pp. 1-18.
International Search Report for International Application No. PCT/CN2013/076777; Date Mailed: Mar. 13, 2014, 11 pages.
U.S. Appl. No. 13/357,707; Non Final Office Action; filed Jan. 25, 2012; Date Mailed: Feb. 4, 2014; pp. 1-56.
U.S. Appl. No. 13/651,715; Non Final Office Action; filed Oct. 15, 2012; Date Mailed: Feb. 5, 2014; pp. 1-52.
U.S. Appl. No. 13/357,767; Non Final Office Action; filed Jan. 25, 2012; Date Mailed: Mar. 10, 2014; pp. 1-37.
U.S. Appl. No. 14/062,920; Non Final Office Action; filed Oct. 25, 2013; Date Mailed: Mar. 10, 2014; pp. 1-33.
U.S. Appl. No. 13/357,704; Non-Final Office Action; filed Jan. 25, 2012; Date Mailed: Mar. 18, 2014; pp. 1-36.
U.S. Appl. No. 13/357,725; Non-Final Office Action; filed Jan. 25, 2012; Mailing Date: Mar. 21, 2014; pp. 1-14.
U.S. Appl. No. 13/651,780; Notice of Allowance; filed Oct. 15, 2012; Date Mailed: Feb. 28, 2014, pp. 1-14.
U.S. Appl. No. 13/672,980; Notice of Allowance; filed Nov. 9, 2012; Date Mailed: Mar. 26, 2014; pp. 1-17.
U.S. Appl. No. 13/673,112; Notice of Allowance; filed Nov. 9, 2012; Date Mailed: Apr. 30, 2014; pp. 1-24.
U.S. Appl. No. 13/672,947; Notice of Allownce; filed Nov. 9, 2012; Date Mailed: Apr. 30, 2014; pp. 1-23.
U.S. Appl. No. 14/051,477; Notice of Allowance; filed Oct. 11, 2013; Date Mailed: Oct. 9, 2014; 13 pages.
U.S. Appl. No. 13/357,707; Final Office Action: filed Jan. 25, 2014; Date Mailed: Jun. 12, 2014; 22 pages.
U.S. Appl. No. 13/673,462; Final Office Action; filed Nov. 9, 2012; Date Mailed: Jun. 12, 2014; 19 pages.
U.S. Appl. No. 13/357,719; Final Office Action; filed Jan. 25, 2012; Date Mailed: Jun. 19, 2014; pp. 1-44.
U.S. Appl. No. 14/051,477; Non-Final Office Action; filed Oct. 11, 2013; Date Mailed Jun. 20, 2014; 31 pages.
U.S. Appl. No. 13/672,877; Notice of Allowance; filed Nov. 9, 2012; Date Mailed: Jun. 25, 2014, pp. 1-11.

\* cited by examiner

THREE DIMENSIONAL LASER IMAGE PROJECTOR

BACKGROUND

The present invention relates to a stereoscopic three dimensional image projector, and more specifically, to a small three dimensional projector usable with passive glasses.

Three dimensional (3D) movies and pictures have become a popular form of entertainment due to the increased realism of the images. 3D images utilize the human physical trait of binocular vision. Human eyes are spaced about 2 inches (5 centimeters) apart, therefore each eye sees the world from a slightly different perspective. The brain receives both images and has a binocular vision function that correlates the difference between what each eye sees to determine distance. The determination of the distance provides the three-dimensional effect that a person sees.

To create a binocular image on a two dimensional surface, such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The projection system emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a three dimensional effect. Originally, passive glasses used different color lenses to filter out images, however this limited the use of 3D images when full color images are desired. To alleviate this issue, polarized lenses were developed where each lens of the glasses allowed the transmission of different polarized light. The polarized passive lenses allowed for full color 3D images to be transmitted. Passive lenses are more common with projector type systems, such as movie theaters for example, where multiple projectors may be used to project the image.

The development of 3D television systems created a new challenge as there typically isn't enough room for multiple projectors. To accommodate this, active lenses were created. With an active lens, the glasses wirelessly communicate with the projector to synchronize the glasses operation with the images being displayed. With active glasses, the lenses are typically liquid crystal displays that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a three dimensional effect.

SUMMARY

According to one embodiment of the present invention, a system is provided having a first light source having a first green laser diode, a first blue laser diode and a first red laser diode. A second light source is disposed adjacent to the first light source, the second light source having a second green laser diode, a second blue laser diode and a second red laser diode, wherein the first light source and the second light source are arranged to emit light on a common optic axis. A mirror is disposed along the common optic axis. A DMD is disposed adjacent the mirror.

According to one embodiment of the present invention, a projector system for a portable electronic device is provided. The projector system includes a first light source having a first green laser diode, a first blue laser diode and a first red laser diode. A second light source is disposed adjacent to the first light source, the second light source having a second green laser diode, a second blue laser diode and a second red laser diode, wherein the first light source and the second light source are arranged to emit light on a common optic axis. A first collimating lens is integrally coupled to the first green laser diode and the second green laser diode. A second collimating lens is integrally coupled to the first blue laser diode and the second blue laser diode. A third collimating lens is integrally coupled to the first red laser diode and the second red laser diode. A mirror is arranged to reflect light from the first light source and the second light source. An imaging device is arranged adjacent the mirror.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Contemporary three-dimensional (3D) image projectors that use passive glasses typically use two projectors. Previous efforts to use only a single projector rely upon an active lens within the projector that switches between the sequential images. It should be appreciated that substantial costs may be involved in using redundant projectors or having a costly active lens. Further, these techniques do not scale well as users desire comparable performance from smaller and smaller projector packages.

A another type of projector uses active glasses having a liquid crystal diode (LCD) lens that coordinates with the projector (typically a television). The active glasses alternately block one of the lenses such that the user will see sequential images through alternating lenses. While active glasses perform well to create the 3D effect for the user, they also have some less desirable characteristics. The active glasses require an energy source such as a battery that needs to be periodically recharged or replaced. If the communication between the television and the glasses is interrupted, the 3D effect may be lost. Further, due to the complexity of the system, the active glasses tend to be much more costly.

Figure 1:
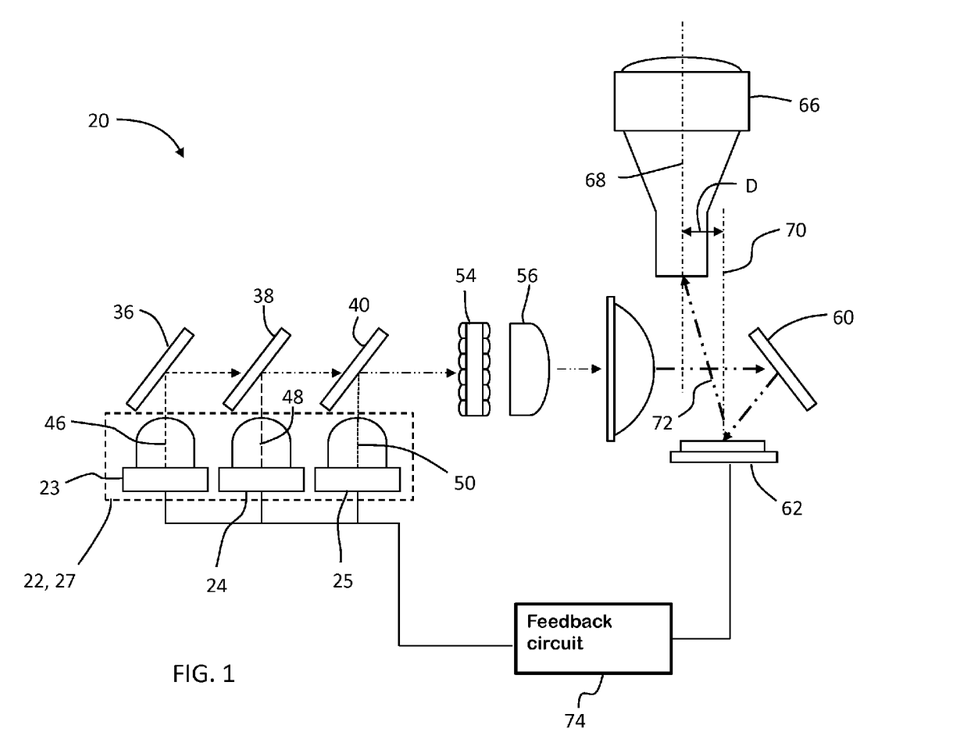
FIG. 1 is side a schematic view of a three-dimensional image projector in accordance with an embodiment of the invention.
Figure 2:
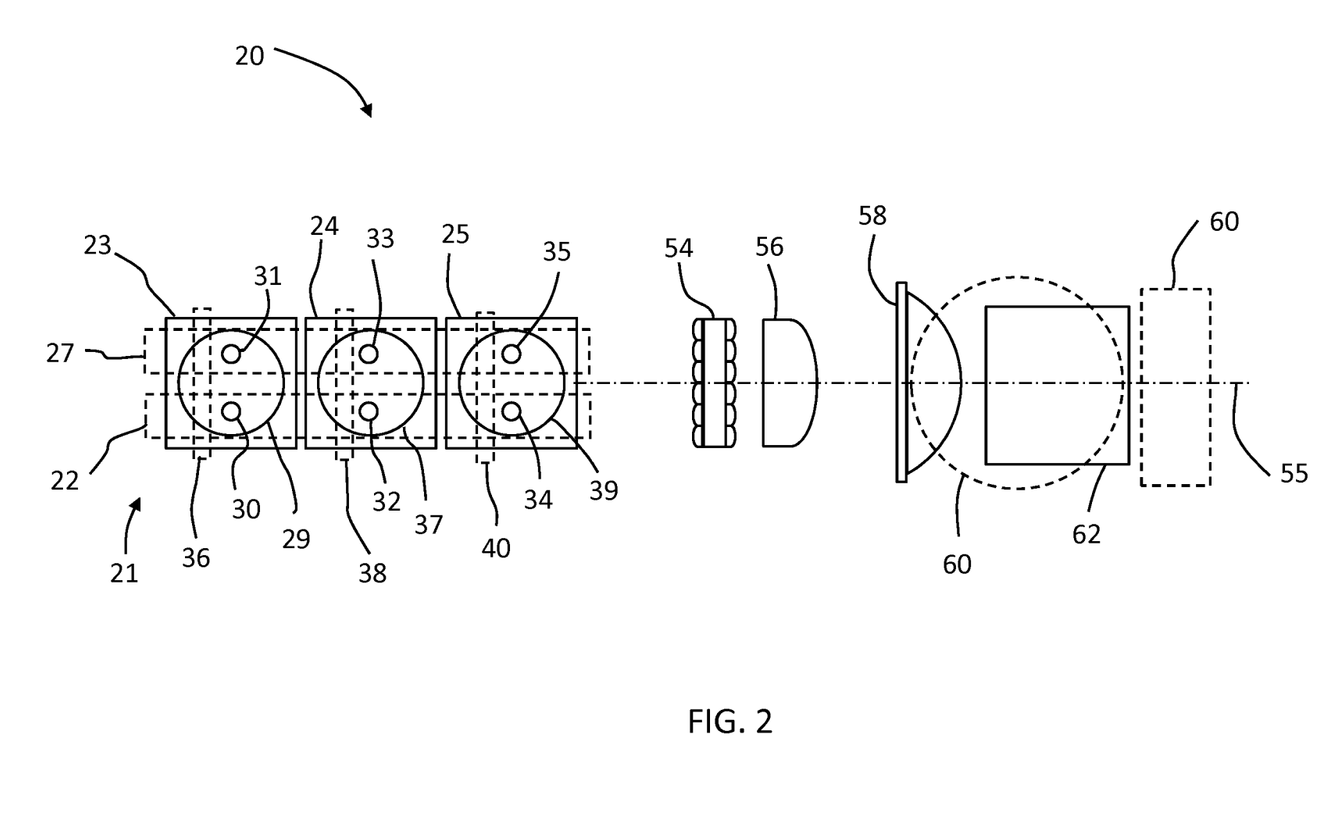
FIG. 2 is top schematic view of the three-dimensional image projector of FIG. 1.

With reference now to FIG. 1 and FIG. 2, a three dimensional projector 20 is shown for projecting a three dimensional (3D) image from a single projection lens in accordance with an embodiment of the invention. The projector 20 includes a light generator 21 having three individual laser light generators 23, 24, 25. In the exemplary embodiment, each laser light generator 23, 24, 25 include a pair of monochromatic laser diodes. As will be discussed in more detail below, each of the pair of monochromatic laser diodes has orthogonal polarizations relative to each other. In the exemplary embodiment, the generator 23 includes a pair of red laser diodes 30, 31, the generator 24 includes a pair of green laser diodes 32, 33 and the third generator 25 a pair of blue laser diode 34, 35.

The generators 23, 24, 25 are arranged in series. As a result, the diodes 30, 32, 34 are aligned in series to form a first light source 22 and the diodes 31, 33, 35 are aligned to form a second light source 27. Each of the generators 30, 32, 34 may include an integrated collimator 29, 37, 39 that directs light toward one of adjacent dichroic mirrors 36, 38, 40.

A dichroic mirror or filter uses alternating layers of optical coatings with different refractive indexes built up upon a glass substrate. The interfaces between the layers of different refractive index produce phased reflections, selectively reinforcing certain wavelengths of light and interfering with other wavelengths. Since unwanted wavelengths are reflected rather than absorbed, dichroic filters do not absorb this unwanted energy during operation which provides advantages in reducing heat when compared with an equivalent light filtering device since the filter will absorb energy all from all wavelengths except the desired color.

The mirrors 36, 38, 40 are each arranged to reflect the color of their respective laser diode 30, 32, 34. Further, the mirrors 36, 38, 40 are disposed on an angle to reflect and blend the individual colors to form white light. In the exemplary embodiment shown in FIG. 1, the first laser diode 30 emits a blue colored light 46 that reflects off of the dichroic mirror 36 towards the dichroic mirror 38. Simultaneously, the second laser diode 32 emits a green colored light 48 that reflects off of the dichroic mirror 38 towards the dichroic mirror 40. The light 46 from the first laser diode 30 mixes with the light 48 from the second laser diode 32.

Simultaneously with the emitting of light 46, 48, the third laser diode 34 emits a red colored light 50 towards dichroic mirror 40. The dichroic mirror 40 reflects the light 50 and allows mixing with the light from diodes 30, 32 to form white light. The dichroic mirrors 36, 38, 40 are angled or shaped to direct the white light in a direction towards a common optic axis 55. As will be discussed in more detail below, each of the light sources 22, 27 are configured with a predetermined polarization. In one embodiment, the polarization of light source 42 is orthogonal to the polarization of light source 44. Further, the light sources 42, 44 are configured to alternately and sequentially emit light onto the common optic axis 55.

The light from the first light source 22 exits and passes through a fly's eye lens 54. The fly's eye lens 54 consists of an array of lenslets that have the effect of breaking the transmitted light into many components and projecting them evenly over the field of view. The result is even, bright illumination without any reduction in light intensity at the periphery of the projected light. Once the light leaves the fly's eye lens 54, the light may pass through an optional condenser lens 56 that concentrates the light.

Next, the light passes through a focusing lens that focuses the light toward a mirror 60. The mirror 60 reflects and spreads the light onto an imaging device 62. The light reflects off of the imaging device 62 with a polarization that then substantially transmits through a projection lens assembly 66 and out of the projector 20. This process is repeated in a sequential manner to for the second light source.

It should be appreciated that since the light sources 22, 27 are arranged adjacent one another and emit light along the common optic axis 54, the light from each source will travel along substantially the same path length to project the image from the projector 20. This simplifies the modulation of the light sources 22, 27 during operation. Further, the laser diodes have a small angular divergence that allows the diodes to be placed close together and share a common integrated collimating lens. This provides advantages in allowing for a compact design.

In the exemplary embodiment, the imaging device 62 is a digital mirror device (DMD). A DMD is an optical semiconductor having several hundred thousand microscopic mirrors arranged in an array. The array of microscopic mirrors forms an image surface or plane that may then be projected. These surface mirrors correspond to pixels in the image being displayed. The mirrors are individually rotated to either reflect the light into the projection lens assembly 66 or reflect the light away (making it dark). Grey scale colors are produced by toggling the microscopic mirrors very quickly. The amount of time the microscopic mirrors are reflecting into projection lens assembly 66 will determine the shade of grey. In another embodiment, the imaging device 62 is be a liquid crystal on silicone (LCoS) type device.

In the exemplary embodiment, the imaging device 62 is arranged with a first axis 70 that extends is substantially perpendicular from the center of the image surface of the DMD image device 62. The projection lens assembly 66 is arranged on a second axis 68. The first axis 70 and the second axis 68 are offset by a distance D such that mirror 60 is arranged reflect the light on vector such that light 72 being reflected off of the imaging device 62 on an angle that allows it to intercept the projection lens assembly 66. In one embodiment, the projector 20 may include an optional back reflection filter to reduce speckle.

It should be appreciated that the use of the light sources 22, 27, and the imaging device 62 in combination with an off-axis mirror allows for a more compact design. As a result, the projector 20 may be scaled or reduced in size into the category of a pico-projector or micro-projector. These small projectors may be suitable to be used in a portable electronic device, such as but not limited to a cellular phone, a tablet computer, a laptop computer, and a hand-held gaming device for example. Embodiments of the present invention may also be used in non-portable devices, such as but not limited to a desktop computer or a television for example. In one embodiment, the projector 20 may be contained within a housing 5-10.5 mm×20-37 mm×20-37 mm.

The projector 20 may also include an optional feedback circuit 74. The feedback circuit 74 is electrically coupled to communicate with the first light source 22, the second light source 27 and the DMD image device 62. The feedback circuit 74 provides a first modulation signal to the light sources 22, 27 and a second modulation signal to the DMD image device 62. The modulation signals keep the light sources and DMD device 62 synchronized during operation. In other words, the feedback circuit 74 ensures that the desired light source 22, 27 is emitting light that corresponds to the image projected through the projection lens assembly 66. In one embodiment, the projector 20 consumes 30 milliwatts or less electrical power during operation. In another embodiment, the first modulation signal transmitted to the light sources 22, 27 are modulated at a frequency two times the frequency of the second modulation transmitted to the DMD image device 62.

Figure 3:
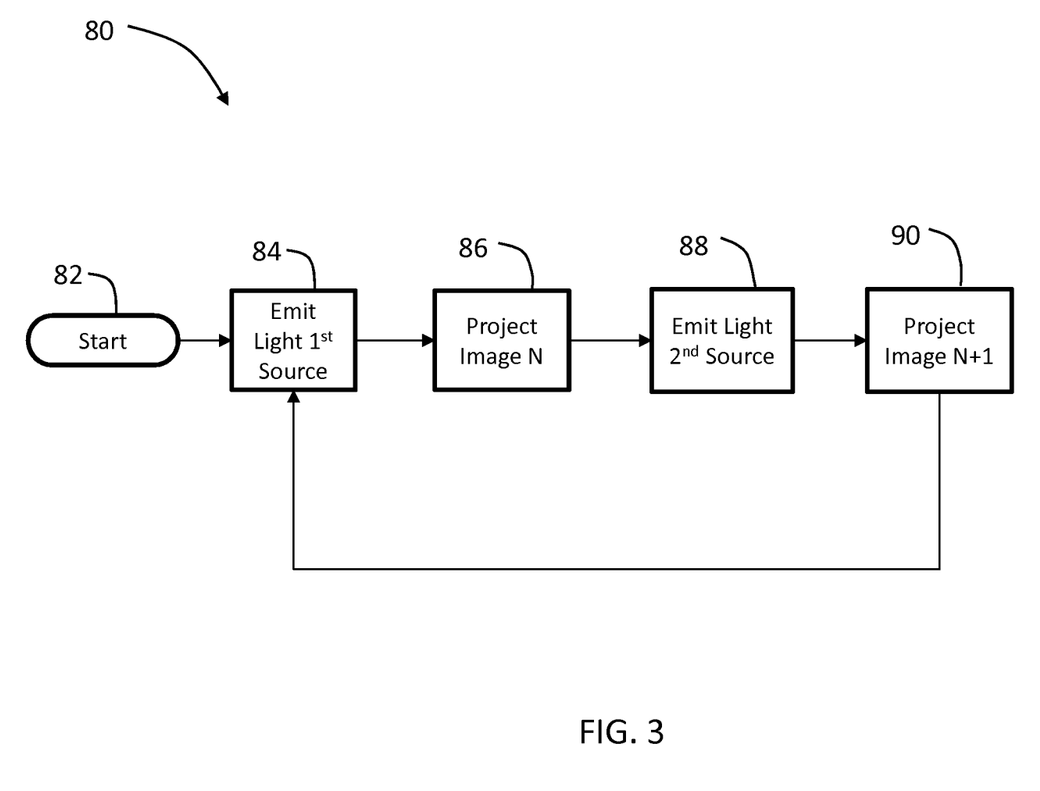
FIG. 3 is a flow chart for a method of operating a three-dimensional image projector in accordance with an embodiment of the invention; and, FIG. 4 is a flow chart for another method of operating a three-dimensional image projector in accordance with another embodiment of the invention.

Referring now to FIG. 2, a method 80 is shown for operating a three dimensional image projector, such as projector 20 for example. The method 80 starts in block 82. The method 80 then emits a light from a first light source in block 84, such as light source 22 for example. The light from the first light source reflects off of the mirror 60 and onto an imaging device, such as DMD imaging device 62 for example. The light is reflected off of the imaging device and through one or more lenses 66 to project an image N out of the projector 20 in block 86. Sequentially the second light source, such as light source 27 for example, emits a light in block 88 which is reflected off of the mirror 60 and onto the imaging device. The light reflects off of the imaging device and is projected out of the projector 20 in block 90. The method 80 then loops back to block 84 to continue projecting images from the projector 20. It should be appreciated that the image N and the image N+1 are similar but slightly offset to create a three-dimensional effect for a user wearing polarized passive glasses.

Figure 4:
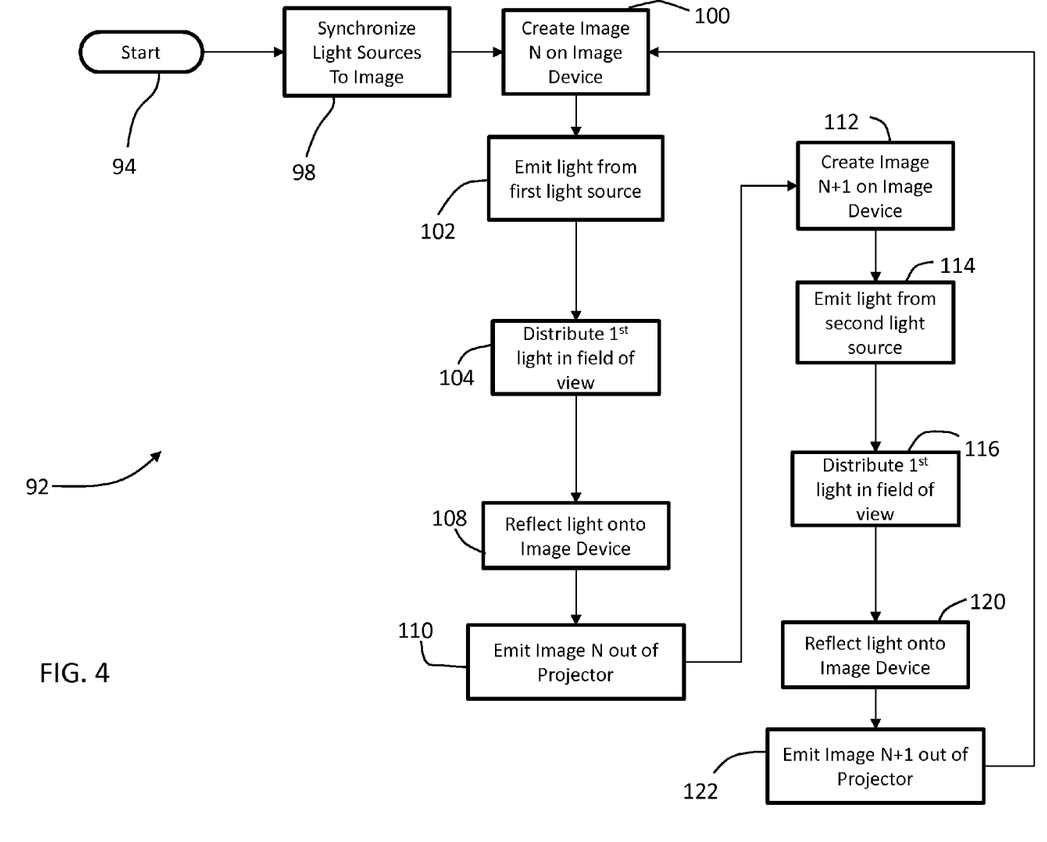

Referring now to FIG. 4, another embodiment of a method 92 is shown for operating a three dimensional image projector, such as projector 20 for example. The method 92 begins in start block 94 and proceeds to block 98 where the light sources, such as light sources 22, 27 for example, receive a modulation signal to synchronize the timing of light being emitted from the light sources with a desired image. In one embodiment, the light emitted from each of the light sources 22, 27 has a predefined polarization. In one embodiment the polarizations of the light sources 22, 27 are orthogonal to each other. An image "N" is created on an imaging device in block 100. Light is emitted from the first light source in block 102. This first light is distributed, such as with a fly's eye lens in block 104. This first light is reflected off of the mirror 60 onto the imaging device in block 108. The first light reflects the image off of the imaging device and through a projecting lens to emit the image N from the projector in block 110.

The method 92 then proceeds to block 112 where an image N+1 is created on the imaging device. The second light source is activated in block 114 to emit light. This second light is then distributed with a lens, such as a fly's eye lens for example, in block 116. The second light is then reflected off of the mirror 60 and onto the imaging device in block 120. The light reflecting off of the imaging device in block 120 is polarized with a polarization that is different from the first light reflected from the imaging device. The second reflected light is transmitted through the projecting lens to emit image N+1 from the projector in block 122. It should be appreciated that the image N and the image N+1 are similar but slightly offset to create a three-dimensional effect for a user wearing polarized passive glasses. It should be appreciated that when the method 92 is repeated, the images may then form a 3D movie on a two dimensional projection surface.

Embodiments of the present invention provide for a small, reliable three-dimensional projector. Embodiments of the present invention provide advantages of having multiple light sources that are arranged to have the same path length for projecting the image. Embodiments provide advantages in emitting a three-dimensional image usable with passive glasses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
a first light source having a first green laser diode, a first blue laser diode and a first red laser diode;
a second light source disposed adjacent to the first light source, the second light source having a second green laser diode, a second blue laser diode and a second red laser diode, wherein the first light source and the second light source are arranged to emit light on a common optic axis, wherein the first light source and second light source are arranged to direct light in the same direction, perpendicular to the common optic axis;
a mirror disposed along the common optic axis; and,
a DMD disposed to reflect light received from the mirror between the mirror and the second light source, the DMD including an image surface and an axis perpendicular to the image surface, the DMD axis being perpendicular to the common optic axis; and
wherein the first light source and second light source are arranged to direct light on the common optic axis past the DMD prior to the light reflecting off of the mirror.

2. The system of claim 1 further comprising a projection lens adjacent the DMD, the projection lens positioned to receive light reflected from the DMD, the projection lens further having a first axis.

3. A system comprising:
a first light source having a first green laser diode, a first blue laser diode and a first red laser diode;
a second light source disposed adjacent to the first light source, the second light source having a second green laser diode, a second blue laser diode and a second red laser diode, wherein the first light source and the second light source are arranged to emit light on a common optic axis;
a mirror disposed along the common optic axis; and,
a DMD disposed adjacent the mirror;
a projection lens adjacent the DMD, the projection lens positioned to receive light reflected from the DMD, the projection lens further having a first axis;
wherein the DMD includes an image surface and a second axis perpendicular to the image surface, the second axis being parallel to and offset from the first axis.

4. The system of claim 3 wherein the second axis is substantially perpendicular to the common optic axis.

5. The system of claim 3 further comprising:
a first dichroic mirror adjacent the first green laser diode and the second green laser diode;
a second dichroic mirror adjacent the first blue laser diode and the second blue laser diode; and,
a third dichroic mirror adjacent the first red laser diode and the second red laser diode.

6. The system of claim 3 further comprising:
a first collimating lens optically coupled to the first green laser diode and the second green laser diode;
a second collimating lens optically coupled to the first blue laser diode and the second blue laser diode; and,
a third collimating lens optically coupled to the first red laser diode and the second red laser diode.

7. The system of claim 3 further comprising a feedback circuit coupled to the first light source, the second light source and the DMD, the feedback circuit providing a first modulation signal to the first light source and the second light source and a second modulation signal to the DMD, wherein the first modulation signal is two times a frequency of the second modulation signal.

8. The system of claim 3 wherein the first light source, the second light source and the DMD are arranged within a space about 5-10.5 mm in height, about 20-37 mm in width and about 20-37 mm in length.

9. The system of claim 3 wherein the first light source, the second light source and the DMD use less than or equal to 30 milliwatts of electrical power.

10. A projector system for a portable electronic device comprising:
a first light source having a first green laser diode, a first blue laser diode and a first red laser diode;
a second light source disposed adjacent to the first light source, the second light source having a second green laser diode, a second blue laser diode and a second red laser diode, wherein the first light source and the second light source are arranged to emit light on a common optic axis;
a first collimating lens integrally coupled to the first green laser diode and the second green laser diode;
a second collimating lens integrally coupled to the first blue laser diode and the second blue laser diode;
a third collimating lens integrally coupled to the first red laser diode and the second red laser diode;
a mirror arranged to reflect light from the first light source and the second light source; and,
an imaging device arranged adjacent the mirror.

11. The projector system of claim 10 further comprising:
a fly's eye lens disposed on the common optic axis between the mirror and the first light source; and
a condenser lens disposed on the common optic axis between the mirror and the fly's eye lens.

12. The projector system of claim 11 further comprising a projection lens arranged adjacent the mirror opposite the imaging device.

13. The projector system of claim 12 wherein the projection lens has a first axis and the imaging device has a second axis substantially perpendicular to a center of the imaging device, the first axis being offset from the second axis.

14. The projector system of claim 10 wherein the imaging device is a digital mirror device.

15. The projector system of claim 14 wherein the first light source, the second light source and the DMD are arranged within a space about 5-10.5 mm in height, about 20-37 mm in width and about 20-37 mm in length.

16. The projector system of claim 15 wherein the first light source, the second light source and the DMD use less than or equal to 30 milliwatts of electrical power.

* * * * *